United States Patent
Pan et al.

(10) Patent No.: US 7,672,256 B2
(45) Date of Patent: Mar. 2, 2010

(54) WIRELESS COMMUNICATION METHOD AND APPARATUS FOR GENERATING A SERVING GRANT BASED ON A RECEIVED RELATIVE GRANT

(75) Inventors: Jung-Lin Pan, Selden, NY (US); Rui Yang, Greenlawn, NY (US); Alexander Reznik, Titusville, NJ (US)

(73) Assignee: InterDigital Technology Corporation, Wilmington, DE (US)

(*) Notice: Subject to any disclaimer, the term of this patent is extended or adjusted under 35 U.S.C. 154(b) by 841 days.

(21) Appl. No.: 11/477,277

(22) Filed: Jun. 29, 2006

(65) Prior Publication Data
US 2007/0054652 A1 Mar. 8, 2007

Related U.S. Application Data

(60) Provisional application No. 60/712,117, filed on Aug. 29, 2005.

(51) Int. Cl.
*H04B 7/00* (2006.01)
*H04Q 7/20* (2006.01)
(52) U.S. Cl. .................. 370/277; 455/403
(58) Field of Classification Search .............. 370/336, 370/329, 252; 375/148; 455/403, 442
See application file for complete search history.

(56) References Cited

U.S. PATENT DOCUMENTS

| | | | |
|---|---|---|---|
| 2003/0007577 A1* | 1/2003 | Shiu et al. | 375/341 |
| 2004/0110473 A1 | 6/2004 | Rudolf et al. | |
| 2005/0094586 A1 | 5/2005 | Zhang et al. | |
| 2006/0215604 A1* | 9/2006 | Mueckenheim et al. | 370/329 |
| 2006/0245476 A1* | 11/2006 | Wang et al. | 375/148 |
| 2008/0089296 A1* | 4/2008 | Kazmi et al. | 370/336 |
| 2008/0253300 A1* | 10/2008 | Wakabayashi et al. | 370/252 |

OTHER PUBLICATIONS

Third Generation Partnership Project, "Technical Specification Group Radio Access Network; Physical Layer Procedures (FDD) (Release 1999)." 3GPP TS 25.214 V 3.12.0 (Mar. 2003).
Third Generation Partnership Project, "Technical Specification Group Radio Access Network; Physical Layer Procedures (FDD) (Release 4)." 3GPP TS 25.214 V 4.6.0 (Mar. 2003).

(Continued)

*Primary Examiner*—Charles N Appiah
*Assistant Examiner*—Kiet Doan
(74) *Attorney, Agent, or Firm*—Volpe and Koenig, PC (57) ABSTRACT

A wireless communication method and apparatus for generating a scheduling grant based on a relative grant are disclosed. A wireless transmit/receive unit (WTRU) receives an absolute grant from a serving radio link set (RLS) and receives a relative grant from the serving RLS and at least one non-serving radio link (RL). The WTRU decodes enhanced dedicated channel (E-DCH) absolute grant channel (E-AGCH) signals to detect an absolute grant, and decodes E-DCH relative grant channel (E-RGCH) signals to detect at least one relative grant. The WTRU then calculates a serving grant based on the detected absolute grant and/or the relative grant(s). The relative grant may be detected by performing a hypothesis test on the E-RGCH signals. A multiple alternative hypothesis test is performed for detecting the E-RGCH signals from the serving RLS and a binary hypothesis test is performed for detecting the E-RGCH signals from the at least one non-serving RL.

16 Claims, 5 Drawing Sheets

OTHER PUBLICATIONS

Third Generation Partnership Project, "Technical Specification Group Radio Access Network; Physical Layer Procedures (FDD) (Release 5)." 3GPP TS 25.214 V 5.11.0 (Jun. 2005).

Third Generation Partnership Project, "Technical Specification Group Radio Access Network; Physical Layer Procedures (FDD) (Release 6)." 3GPP TS 25.214 V 6.6.0 (Jun. 2005).

Third Generation Partnership Project, "Technical Specification Group Radio Access Network; Physical Layer Procedures (FDD) (Release 6)." 3GPP TS 25.214 V 6.9.0 (Jun. 2006).

Third Generation Partnership Project, "Technical Specification Group Radio Access Network; FDD Enhanced Uplink, Overall Description; Stage 2 (Release 6)," 3GPP TS 25.309 V 6.3.0 (Jun. 2005).

Third Generation Partnership Project, "Technical Specification Group Radio Access Network; FDD Enhanced Uplink, Overall Description; Stage 2 (Release 6)," 3GPP TS 25.309 V 6.6.0 (Mar. 2006).

* cited by examiner

WIRELESS COMMUNICATION METHOD AND APPARATUS FOR GENERATING A SERVING GRANT BASED ON A RECEIVED RELATIVE GRANT

CROSS REFERENCE TO RELATED APPLICATION

This application claims the benefit of U.S. provisional application No. 60/712,117 filed Aug. 29, 2005, which is incorporated by reference as if fully set forth.

FIELD OF INVENTION

The present invention is related to a wireless communication system. More particularly, the present invention is related to a wireless communication method and apparatus for generating a scheduling grant based on a relative grant received via an enhanced dedicated channel (E-DCH) relative grant channel (E-RGCH).

BACKGROUND

Enhanced uplink (EU) is one of the major features in third generation partnership project (3GPP) frequency division duplex (FDD) systems. EU offers a peak data rate of 5.76 Mbps. In order to support EU operation, several downlink physical channels are provided to transmit control information. One of the downlink physical channels is the E-RGCH.

Figure 1:
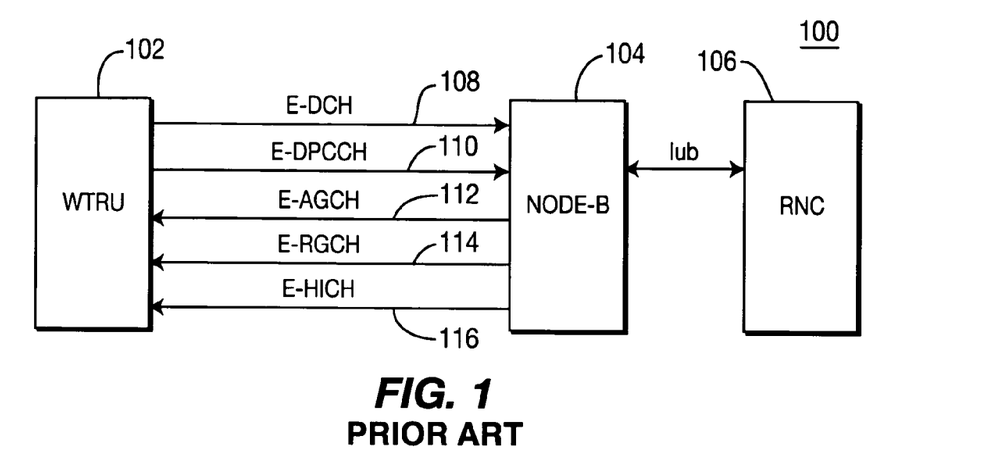
FIG. 1 is a block diagram of a conventional wireless communication system.

FIG. 1 is a block diagram of a conventional wireless communication system 100 which supports EU. The system 100 comprises a wireless transmit/receive unit (WTRU) 102, a Node-B 104 and a radio network controller (RNC) 106. The RNC 106 controls overall E-DCH operation by configuring E-DCH parameters for the Node-B 104 and the WTRU 102, such as initial transmit power level, maximum allowed transmit power or available channel resources per Node-B. Between the WTRU 102 and the Node-B 104, an E-DCH 108, an E-DCH dedicated physical control channel (E-DPCCH), an E-DCH absolute grant channel (E-AGCH) 112, an E-RGCH 114 and an E-DCH hybrid automatic repeat request (H-ARQ) indicator channel (E-HICH) 116 are established for supporting E-DCH operations.

For E-DCH transmissions, the WTRU 102 sends scheduling requests, (also known as rate requests), for the logical channels which a radio resource control (RRC) determines that reporting is needed to be made to the Node-B 104 via the E-DCH 108. The scheduling requests are transmitted in the form of scheduling information and a happy bit. The happy bit is transmitted via the E-DPCCH 110 whenever the E-DPCCH 110 is transmitted. The Node-B 104 sends a scheduling grant to the WTRU 102 via the E-AGCH 112 or the E-RGCH 114. The scheduling grant is one of absolute grant and a relative grant. The absolute grant is sent by an E-DCH serving radio link set (RLS) via the E-AGCH 112, and the relative grant is sent by either the E-DCH serving RLS or an E-DCH non-serving radio link (RL) via the E-RGCH 114. After E-DCH radio resources are allocated for the WTRU 102, the WTRU 102 transmits uplink data via the E-DCH 108. In response to E-DCH or E-DPCCH transmissions, the Node-B 104 sends an acknowledgement (ACK) or a non-acknowledgement (NACK) message for H-ARQ operation via the E-HICH 116.

The E-AGCH 112 carries the absolute grant in the form of a maximum power ratio for the WTRU 102. The maximum power ratio is given by the ratio of enhanced uplink dedicated physical data channel (E-DPDCH) over dedicated physical control channel (DPCCH) power. The E-RGCH 114 carries the relative grant. The relative grant indicates power (or power ratio) up or down commands to adjust the absolute grant. The E-DCH serving RLS may send UP, DOWN or HOLD commands. The E-DCH non-serving RL may send UP or HOLD commands. The UP, DOWN or HOLD commands indicate an increase, decrease or no change of the maximum allowed power ratio of the WTRU 102 for the scheduled transmission of data, respectively. The commands from different non-serving RLs may be different from one another. The E-DCH non-serving RLs send the relative grant to prevent system overloading in data traffic and maintain the intra-cell and inter-cell interference at the required level.

The successful detection and decoding of the E-RGCH 114 is important for the performance of systems and the performance of enhanced uplink. Therefore, it is desirable to have a method and apparatus for efficiently detecting and decoding E-RGCH signals.

SUMMARY

The present invention is related to a wireless communication method and apparatus for generating a scheduling grant based on a relative grant. A WTRU receives an absolute grant from a serving RLS and receives at least one relative grant from the serving RLS and at least one non-serving RL. The WTRU decodes E-AGCH signals to detect an absolute grant, and decodes E-RGCH signals to detect at least one relative grant. The WTRU then calculates a serving grant based on the detected absolute grant and/or the relative grant(s). The relative grant may be detected by performing a hypothesis test on the E-RGCH signals. A multiple alternative hypothesis test is performed for detecting the E-RGCH signals from the serving RLS, and a binary hypothesis test is performed for detecting the E-RGCH signals from the at least one non-serving RL. A reliability test may be further performed on the E-RGCH signals.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B"

includes but is not limited to a base station, a site controller, an access point (AP) or any other type of interfacing device in a wireless environment.

The features of the present invention may be incorporated into an integrated circuit (IC) or be configured in a circuit comprising a multitude of interconnecting components.

Figure 2:
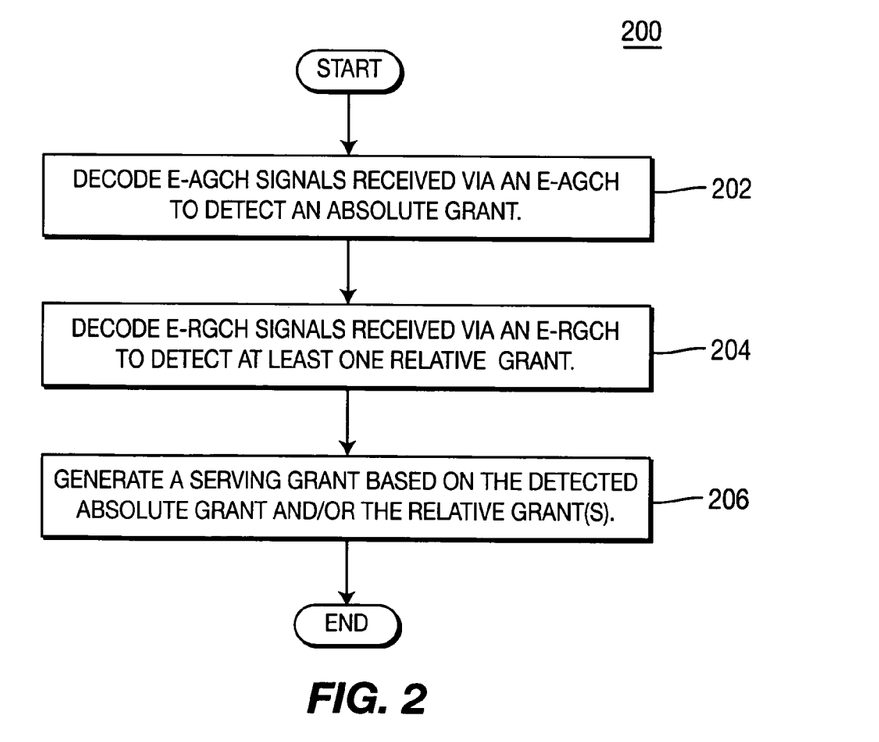
FIG. 2 is a flow diagram of a process of detecting and decoding E-RGCH signals in accordance with the present invention.

FIG. 2 is a flow diagram of a process 200 of detecting and decoding E-RGCH signals in accordance with the present invention. E-AGCH signals received from a serving RLS via an E-AGCH are decoded to detect an absolute grant (step 202). E-RGCH signals received from a serving RLS, a non-serving RL, or both via an E-RGCH are decoded to detect at least one relative grant (step 204). A serving grant is then generated based on the detected absolute grant and/or the relative grant(s) (step 206).

Figure 3:
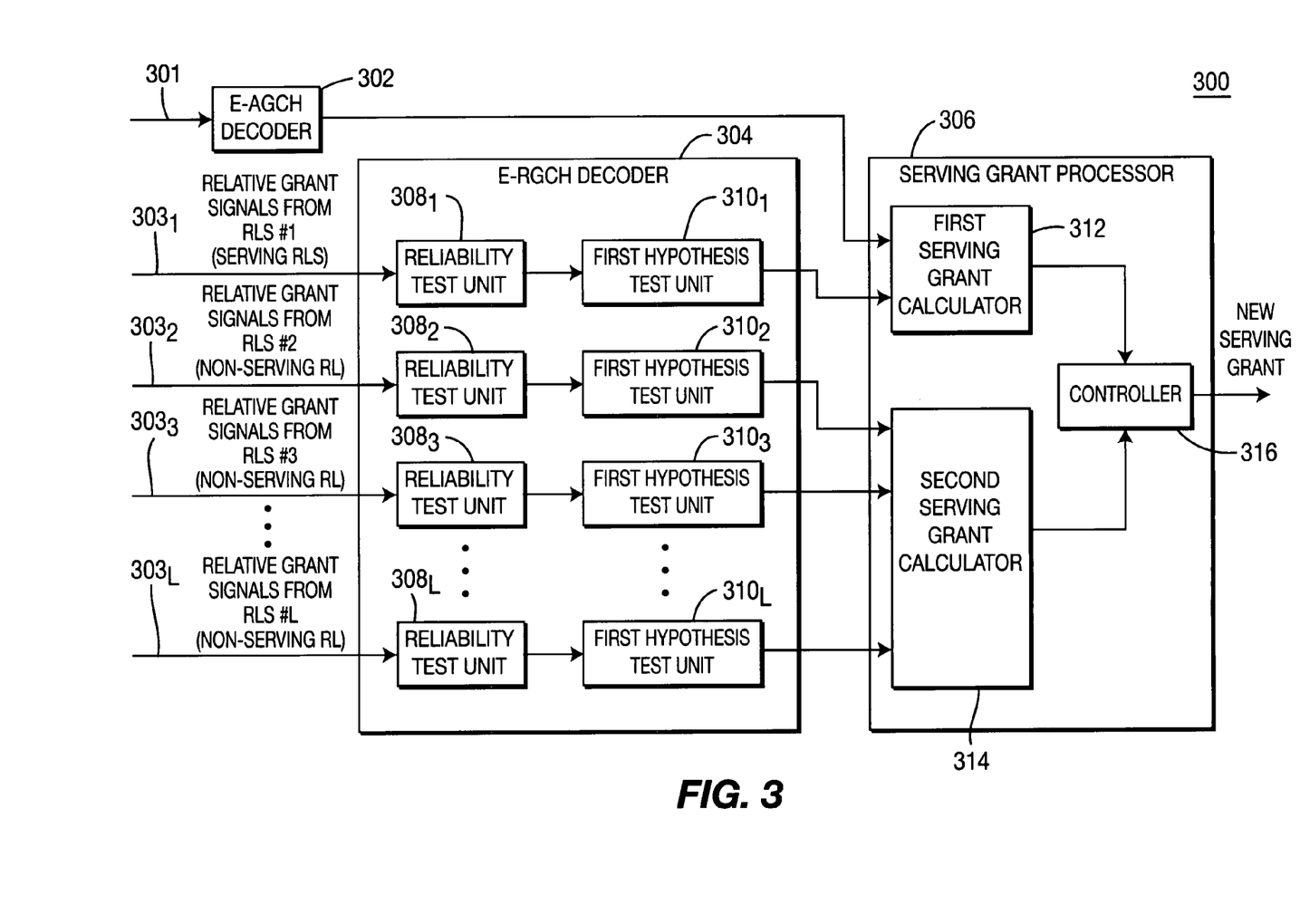
FIG. 3 is a block diagram of a WTRU configured in accordance with the present invention.

FIG. 3 is a block diagram of a WTRU 300 configured in accordance with the present invention. The WTRU 300 includes an E-AGCH decoder 302, an E-RGCH decoder 304 and a serving grant processor 306. The E-AGCH decoder 302 receives and decodes E-AGCH signals 301 received from the serving RLS to detect an absolute grant. The detected absolute grant is sent to the serving grant processor 306. The E-RGCH decoder 304 receives and decodes a plurality of E-RGCH signals $303_1$-$303_L$ received via the E-RGCH to detect at least one relative grant. The detected relative grant is sent to the serving grant processor 306. The serving grant processor 306 generates a serving grant based on the absolute grant and/or the relative grant(s).

The E-RGCH decoder 304 includes a first hypothesis test unit $310_1$ and at least one second hypothesis test unit $310_2$-$310_L$. The E-RGCH signals received from the serving RLS are soft combined before the hypothesis test and the soft combined E-RGCH signals $303_1$ are sent to the first hypothesis test unit $310_1$. The first hypothesis test unit $310_1$ performs a hypothesis test on the soft combined E-RGCH signals $303_1$ and outputs a relative grant, (one of UP, HOLD and DOWN command), to the serving grant processor 306. The second hypothesis test unit $310_2$-$310_L$ performs a hypothesis test on the E-RGCH signals $303_2$-$303_L$ received from the non-serving RL(s) and outputs at least one relative grant, (one of HOLD and DOWN command), to the serving grant processor 306. A multiple alternative hypothesis test is performed for detecting the E-RGCH signals from the serving RLS, and a binary hypothesis test is performed for detecting the E-RGCH signals from the non-serving RL, which will be explained in detail hereinafter.

The E-RGCH decoder 304 may further include reliability test units $308_1$-$308_L$ to perform a signal reliability test before decoding the E-RGCH signals $303_1$-$303_L$. The signal reliability tests may be performed based on signal-to-noise ratio (SNR) measurements. It should be noted that the SNR-based signal reliability test is an example and any other method may be performed. Each of the reliability test units $308_1$-$308_L$ compare a measured, (or calculated), SNR of the E-RGCH against an SNR threshold. If the measured SNR is larger than the SNR threshold, the detection of the E-RGCH signals is determined to be reliable and the hypothesis test is performed subsequently. Otherwise, the detection of the E-RGCH signals is determined not to be reliable and the following hypothesis test is not performed.

Assume that the E-RGCH has average energy $E_l$ for the l-th RLS after correlation and soft combining. For a serving RLS, the UP, HOLD and DOWN commands are represented by $\sqrt{E_l}$, 0 and $-\sqrt{E_l}$, respectively. For a non-serving RL, the DOWN and HOLD commands are represented by $-\sqrt{E_l}$ and 0, respectively. $y^l$ denotes the soft sample after correlation for the l-th RLS. Without loss of generality, it is assumed that the first RLS (l=1) is the serving RLS and the remaining RLSs (l=2, 3, . . . , L) are non-serving RLs. A log likelihood ratio (LLR) for the hypothesis test for detection between UP and HOLD for the serving RLS is as follows:

$$LLR_1^{(1)} = \ln \frac{P_r(y^{(1)}|H_1)}{P_r(y^{(1)}|H_0)} \qquad \text{Equation (1)}$$

An LLR for hypothesis tests for detection between DOWN and HOLD for the serving RLS is as follows:

$$LLR_2^{(1)} = \ln \frac{P_r(y^{(1)}|H_2)}{P_r(y^{(1)}|H_0)}; \qquad \text{Equation (2)}$$

where $H_0$, $H_1$ and $H_2$ denote the hypothesis HOLD, UP and DOWN, respectively. White Gaussian noise with variance $\sigma^2$ after correlation is assumed. The relative grant is detected by comparing the $LLR_1^{(l)}$ and $LLR_2^{(l)}$ with detection thresholds, $T_1^{(l)}$ and $T_2^{(l)}$, respectively. The detection rules for the serving RLS are as follows:

$$\text{UP, if } LLR_1^{(1)} = \frac{1}{\sigma} y^{(1)} \sqrt{\gamma_1} - \frac{1}{2}\gamma_1 > T_1^{(1)};$$

$$\text{DOWN, if } LLR_2^{(1)} = \frac{1}{\sigma} y^{(1)} \sqrt{\gamma_1} - \frac{1}{2}\gamma_1 > T_2^{(1)};$$

and

HOLD, otherwise, where $$\gamma_1, \left( = \frac{E_1}{\sigma^2} \right),$$

denotes an average SNR of the E-RGCH for the serving RLS after correlation and soft combining.

Similarly, the LLR for hypothesis tests for detection between DOWN and HOLD for the non-serving RL, (i.e., l-th RL), is as follows:

$$LLR_2^{(l)} = \ln \frac{P_r(y_1^{(l)}|H_2)}{P_r(y_1^{(l)}|H_0)}, l = 2, 3, \ldots, L. \qquad \text{Equation (3)}$$

The relative grant is detected by comparing the $LLR_2^{(l)}$ with a detection threshold $T_2^{(l)}$. The detection rule for the non-serving RL is as follows:

$$\text{DOWN, if } LLR_2^{(l)} = \frac{1}{\sigma} y^{(l)} \sqrt{\gamma_l} - \frac{1}{2}\gamma_l > T_2^{(l)}, l = 2, 3, \ldots, L;$$

and

HOLD, otherwise, where $\gamma_l$, l=2, 3, . . . , L denotes an average SNR of the E-RGCH for the non-serving RL (the l-th RLS) after correlation and soft combining. Noise estimation for σ and SNR estimation for γ are required. The thresholds $T_1^{(l)}$, $T_2^{(l)}$ and $T_2^{(l)}$, l=2, 3 , . . . , L are determined based on the performance requirements of detection and designs. The optimum detection thresholds may be determined by simulations.

When multiple measurements are available, detection of the E-RGCH signals may be performed by using multiple measurement hypothesis tests. It is assumed that there are M measurements. $\gamma_m^l$ denotes the soft sample after correlation for the l-th RL and the m-th correlation output. Without loss of generality, it is assumed that the first RLS is the serving RLS and the remaining RLSs are the non-serving RLs. The LLR for multiple measurement hypothesis tests for detection between UP and HOLD for the serving RLS is expressed as follows:

$$LLR_1^{(1)} = \ln \frac{P_r(y_1^{(1)}, y_2^{(1)}, \ldots, y_M^{(1)}|H_1)}{P_r(y_1^{(1)}, y_2^{(1)}, \ldots, y_M^{(1)}|H_0)}. \qquad \text{Equation (4)}$$

The LLR for multiple measurement hypothesis tests for detection between DOWN and HOLD for the serving RLS is expressed as follows:

$$LLR_2^{(1)} = \ln \frac{P_r(y_1^{(1)}, y_2^{(1)}, \ldots, y_M^{(1)}|H_2)}{P_r(y_1^{(1)}, y_2^{(1)}, \ldots, y_M^{(1)}|H_0)}. \qquad \text{Equation (5)}$$

The relative grant is detected by comparing the $LLR_1^{(l)}$ and $LLR_2^{(l)}$ with detection thresholds, $T_1^{(l)}$ and $T_2^{(l)}$, respectively. The detection rules for the serving RLS using multiple measurement hypothesis tests is as follows:

$$\text{UP, if } LLR_1^{(1)} = \sum_{m=1}^{M} \left( \frac{1}{\sigma} y_m^{(1)} \sqrt{\gamma_1} - \frac{1}{2}\gamma_1 \right) > T_1^{(1)};$$

$$\text{DOWN, if } LLR_2^{(1)} = \sum_{m=1}^{M} \left( \frac{1}{\sigma} y_m^{(1)} \sqrt{\gamma_1} - \frac{1}{2}\gamma_1 \right) > T_2^{(1)};$$

and

HOLD, otherwise.

Similarly, the LLR for hypothesis tests for detecting between DOWN and HOLD for the non-serving RL using multiple measurement hypothesis is as follows:

$$LLR_2^{(l)} = \ln \frac{P_r(y_1^{(l)}, y_2^{(l)}, \ldots, y_M^{(l)}|H_2)}{P_r(y_1^{(l)}, y_2^{(l)}, \ldots, y_M^{(l)}|H_0)}, l = 2, 3, \ldots, L \qquad \text{Equation (6)}$$

The relative grant is detected by comparing the $LLR_2^{(l)}$ with a detection threshold $T_2^{(l)}$. The detection rule for the non-serving RL using multiple hypothesis tests is as follows:

$$\text{DOWN, if } LLR_2^{(l)} = \sum_{m=1}^{M} \left( \frac{1}{\sigma} y_m^{(l)} \sqrt{\gamma_l} - \frac{1}{2}\gamma_l \right) > T_2^{(l)};$$

and

HOLD, otherwise.

The thresholds $T_1^{(l)}$, $T_2^{(l)}$ and $T_2^{(l)}$, l=2, 3, . . . , L above are determined based on the performance requirements of detection and designs. The optimum detection thresholds can be determined by simulations.

Figure 4:
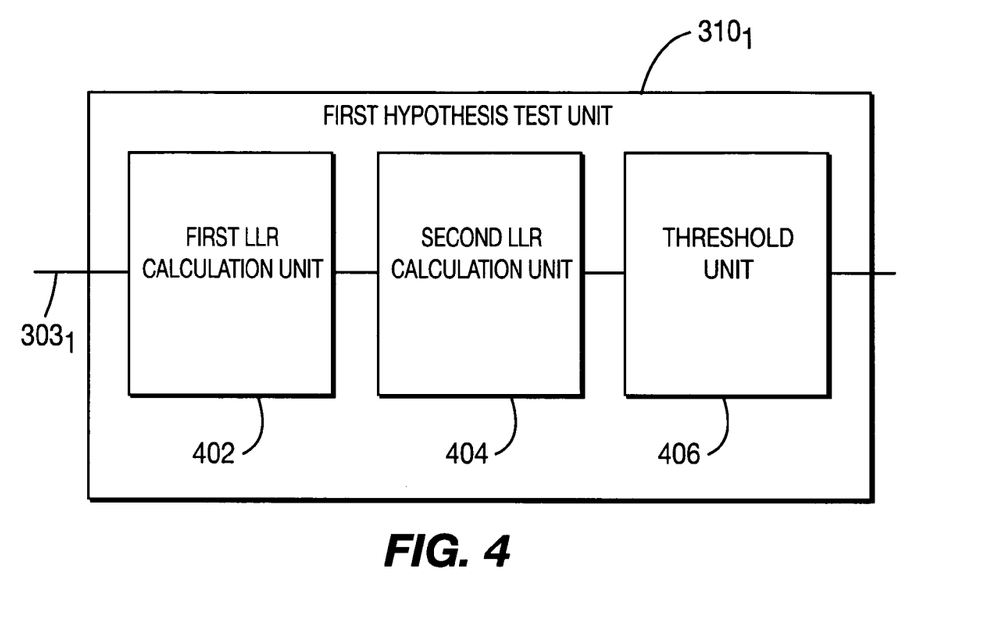
FIGS. 4 and 5 are block diagrams of a first hypothesis test unit and a second hypothesis test unit of the WTRU of FIG. 3.

FIG. 4 is a block diagram of a first hypothesis test unit $310_1$ in accordance with the present invention. The first hypothesis test unit $310_1$ includes a first LLR calculation unit 402, a second LLR calculation unit 404 and a threshold unit 406. The first LLR calculation unit 402 calculates a first LLR of a conditional probability that an UP command is detected to a conditional probability that a HOLD command is detected based on the received E-RGCH signals $303_1$. The second LLR calculation unit 404 calculates a second LLR of a conditional probability that a DOWN command is detected to a conditional probability that a HOLD command is detected based on the received E-RGCH signals $303_1$. The threshold unit 406 compares the first LLR with a first detection threshold and the second LLR with a second detection threshold. The threshold unit 406 then outputs an UP command if the first LLR is equal to or greater than the first detection threshold and outputs a DOWN command if the second LLR is equal to or greater than the second detection threshold. Otherwise, the threshold unit 406 outputs a HOLD command.

Figure 5:
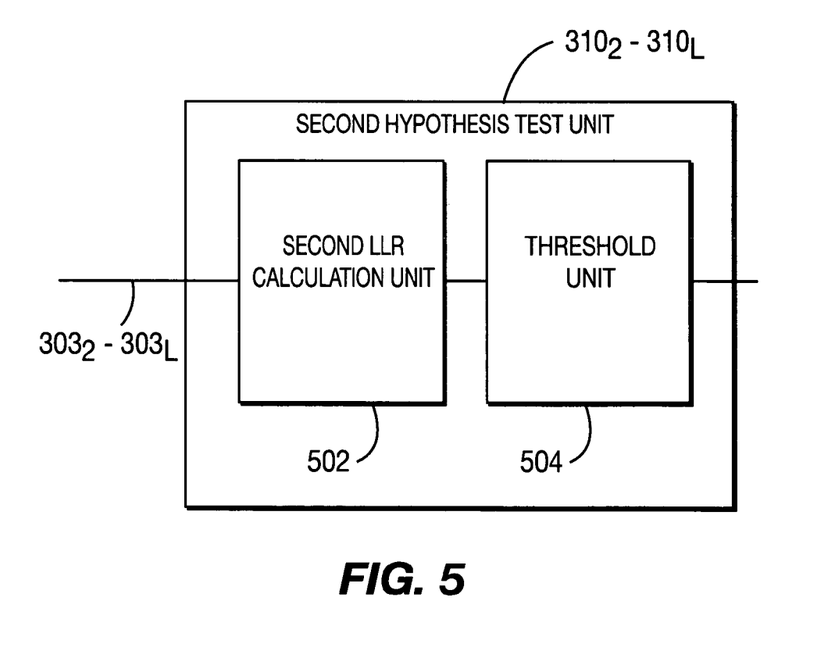

FIG. 5 is a block diagram of a second hypothesis test unit $310_2$-$310_L$ in accordance with the present invention. The second hypothesis test unit $310_2$-$310_L$ includes a second LLR calculation unit 502 and a threshold unit 504. The LLR calculation unit 502 calculates an LLR of a conditional probability that a DOWN command is detected to a conditional probability that a HOLD command is detected based on the received E-RGCH signals $303_1$-$303_L$. The threshold unit 504 compares the LLR with a detection threshold. The threshold unit 504 then outputs a DOWN command if the LLR is equal to or greater than the detection threshold. Otherwise, the threshold unit 504 outputs a HOLD command.

Figure 6:
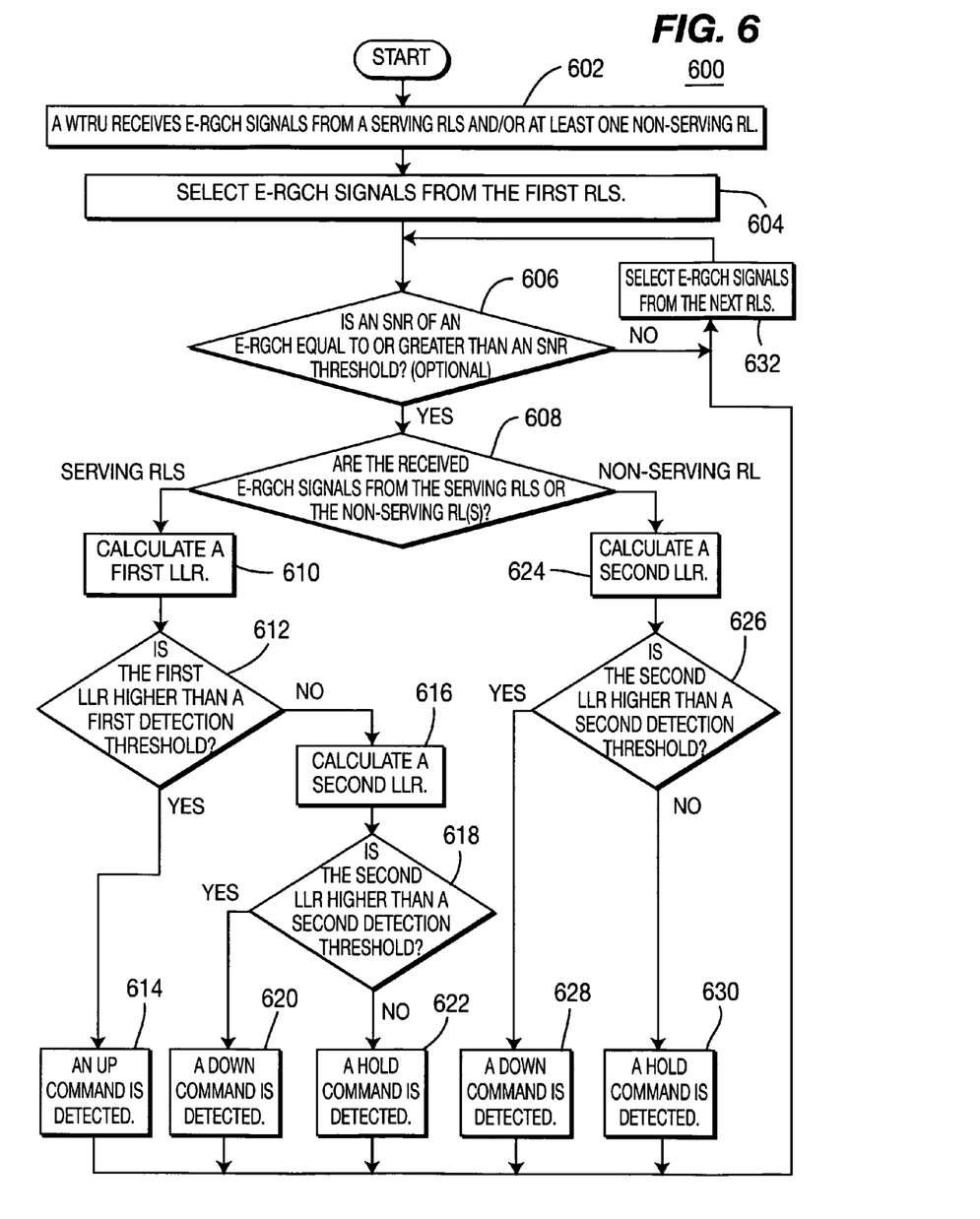
FIG. 6 is a flow diagram of a process of detecting a relative grant command in accordance with the present invention.

FIG. 6 is a flow diagram of a process 600 of detecting a relative grant command in accordance with the present invention. A WTRU receives E-RGCH signals from a serving RLS and/or at least one non-serving RL (step 602). There may be zero, one or more than one non-serving RLs. The WTRU selects E-RGCH signals from the first RLS (step 604). An optional reliability test is then performed at step 606. For example, the reliability test may be performed by determining whether an SNR of the E-RGCH is equal to or greater than an SNR threshold. If the SNR of the E-RGCH is less than the SNR threshold, E-RGCH signals from the next RLS are selected at step 632 and the process 600 returns to step 606.

If the reliability test passes, (i.e., the SNR of the E-RGCH is equal to or greater than the SNR threshold), it is further determined whether the received E-RGCH signals are from the serving RLS or the non-serving RL (step 608). If the received E-RGCH signals are from the serving RLS, a first LLR is calculated (step 610). It is then determined whether the first LLR is higher than a first detection threshold (step 612). If the first LLR is higher than the first detection threshold, an UP command is detected (step 614). If not, a second LLR is calculated (step 616). It is then determined whether the second LLR is higher than a second detection threshold (step 618). If the second LLR is higher than the second threshold, a DOWN command is detected (step 620). If not, a HOLD command is detected (step 622).

If, in step 608, it is determined that the received E-RGCH signals are from the non-serving RL, a second LLR is calculated (step 624). It is then determined whether the second LLR is higher than a second detection threshold (step 626). If the second LLR is higher than the second detection threshold, a DOWN command is detected (step 628). If not, a HOLD command is detected (step 630).

Figure 7:
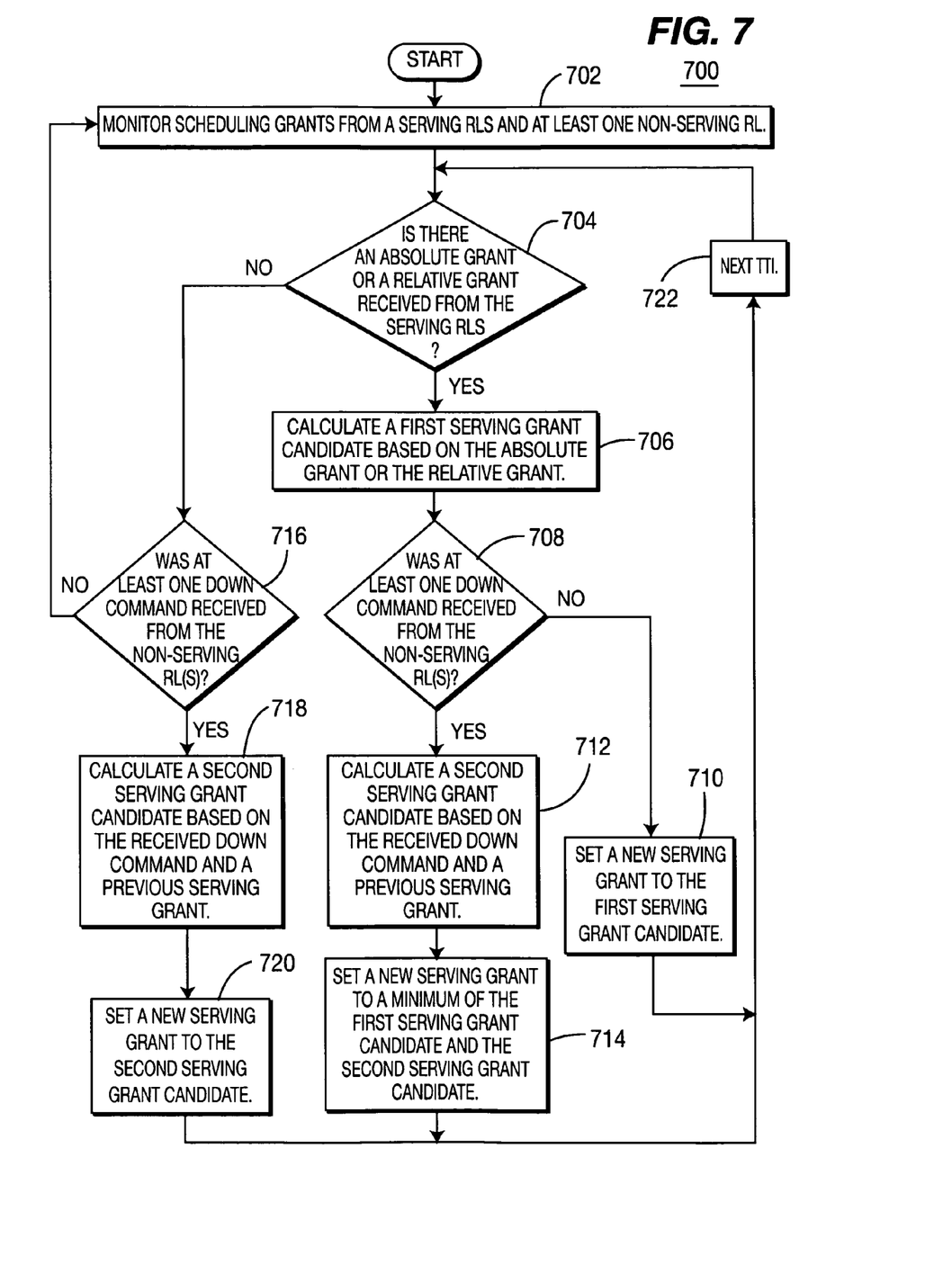
FIG. 7 is a flow diagram of a process of generating a serving grant in accordance with the present invention.

FIG. 7 is a flow diagram of a process 700 for generating a serving grant in accordance with the present invention. A WTRU monitors scheduling grants, (i.e., an absolute grant and relative grant(s)), from a serving RLS and at least one non-serving RL (step 702). It is then determined whether there is an absolute grant or a relative grant received from the serving RLS (step 704). If there is an absolute grant or a relative grant received from the serving RLS, a first serving grant candidate is calculated based on the absolute grant or the relative grant (step 706). It is then determined whether there is at least one DOWN command received from the non-serving RL(s) (step 708). If a DOWN command is not received from the non-serving RL(s), a new serving grant is set to the first serving grant candidate (step 710) and the process 700 waits for the next transmission time interval (TTI) at step 722 before proceeding to step 704. If there is a DOWN command received from the non-serving RL, a second serving grant candidate is calculated based on the DOWN command and a previous serving grant (step 712). A new serving grant is then set to a minimum one of the first serving grant candidate and the second serving grant candidate (step 714) and the process 700 waits for the next TTI at step 722 before proceeding to step 704. The new serving grant is set to the minimum one because the serving cell may reduce the scheduling grant by more than the relative grant down step size.

If, in step 704, it is determined that there is no absolute grant and relative grant received from the serving RLS, it is further determined whether there is a DOWN command received from the non-serving RL (step 716). If there is no DOWN command received from the non-serving RL, the process 700 returns to step 702 to monitor the scheduling grants. If there is a DOWN command received from the non-serving RL, a second serving grant candidate is calculated based on the DOWN command and a previous serving grant (step 718). A new serving grant is then set to the second serving grant candidate (step 720) and the process 700 waits for the next TTI at step 722 before proceeding to step 704.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless communication method that supports enhanced uplink (EU) such that an absolute grant is received via an enhanced dedicated channel (E-DCH) absolute grant channel (E-AGCH) and a relative grant is received via an E-DCH relative grant channel (E-RGCH), a method of generating a serving grant, comprising:
    decoding E-AGCH signals received via the E-AGCH to detect an absolute grant;
    decoding E-RGCH signals received via the E-RGCH to detect at least one relative grant;
    generating a serving grant based on at least one of the detected absolute grant and the relative grant, wherein the relative grant is detected by performing a hypothesis test on the E-RGCH signals;
    calculating a log likelihood ratio (LLR) of a conditional probability that a DOWN command is detected to a conditional probability that a HOLD command is detected based on E-RGCH signals received from at least one non-serving radio link (RL);
    determining that the relative grant is a DOWN command if the LLR is equal to or greater than a detection threshold; and
    determining that the relative grant is a HOLD command if the LLR is less than the detection threshold.

2. The method of claim 1 wherein the hypothesis test is performed based on multiple measurements of the E-RGCH signals.

3. The method of claim 1 further comprising:
    performing a reliability test on the E-RGCH signals, whereby the hypothesis test is performed only if the reliability test is passed.

4. The method of claim 3 wherein the reliability test is performed by comparing a signal-to-noise ratio (SNR) of the E-RGCH to an SNR threshold.

5. The method of claim 1 wherein the step of generating a serving grant comprises:
    determining whether there is a scheduling grant received from a serving radio link set (RLS), the scheduling grant being at least one of an absolute grant and a relative grant;
    if there is a scheduling grant received from the serving RLS, calculating a first serving grant candidate based on the received scheduling grant;
    determining whether there is a DOWN command received from at least one non-serving radio link (RL); and
    if there is no DOWN command received from the at least one non-serving RL, setting the first serving grant candidate as a new serving grant.

6. The method of claim 5 further comprising:
    if there is a DOWN command received from the at least one non-serving RL, calculating a second serving grant candidate based on the DOWN command and a previous serving grant; and
    setting a minimum of the first serving grant candidate and the second serving grant candidate as a new serving grant.

7. The method of claim 5 further comprising:
    if there is no scheduling grant received from the serving RLS, determining whether there is a DOWN command received from the at least one non-serving RL;
    if there is a DOWN command received from the at least one non-serving RL, calculating a second serving grant candidate based on the DOWN command and a previous serving grant; and
    setting the second serving grant candidate as a new serving grant.

8. A wireless communication method that supports enhanced unlink (EU) such that an absolute grant is received via an enhanced dedicated channel (E-DCH) absolute grant channel (E-AGCH) and a relative grant is received via an E-DCH relative grant channel (E-RGCH), a method of generating a serving grant, comprising:
    decoding E-AGCH signals received via the E-AGCH to detect an absolute grant;
    decoding E-RGCH signals received via the E-RGCH to detect at least one relative grant;
    generating a serving grant based on at least one of the detected absolute grant and the relative grant, wherein the relative grant is detected by performing a hypothesis test on the E-RGCH signals;
    calculating a first log likelihood ratio (LLR) of a conditional probability that an UP command is detected to a conditional probability that a HOLD command is detected based on E-RGCH signals received from a serving radio link set (RLS);

determining that the relative grant is an UP command if the first LLR is equal to or greater than a first detection threshold;

if the first LLR is less than the first detection threshold, calculating a second LLR of a conditional probability that a DOWN command is detected to a conditional probability that a HOLD command is detected based on the E-RGCH signals received from the serving RLS;

determining that the relative grant is a DOWN command if the second LLR is equal to or greater than a second detection threshold; and determining that the relative grant is a HOLD command if the second LLR is less than the second detection threshold.

9. A wireless transmit/receiver unit (WTRU) that supports enhanced uplink (EU) such that an absolute grant is received via an enhanced dedicated channel (E-DCH) absolute grant channel (E-AGCH), and a relative grant is received via an E-DCH relative grant channel (E-RGCH), the wireless transmit/receive unit generating a serving grant, the WTRU comprising:

an E-AGCH decoder configured to decode E-AGCH signals received via the E-AGCH to detect an absolute grant;

an E-RGCH decoder configured to decode E-RGCH signals received via the E-RGCH to detect at least one relative grant;

a serving grant processor configured to generate a serving grant based on at least one of the absolute grant and the relative grant;

a first hypothesis test unit configured to perform a hypothesis test on E-RGCH signals received from a serving radio link set (RLS);

a first log likelihood ratio (LLR) calculation unit configured to calculate a first LLR of a conditional probability that an UP command is detected to a conditional probability that a HOLD command is detected based on E-RGCH signals received from the serving RLS;

a second LLR calculation unit configured to calculate a second LLR of a conditional probability that a DOWN command is detected to a conditional probability that a HOLD command is detected based on the E-RGCH signals received from the serving RLS; and a threshold unit configured to compare the first LLR with a first detection threshold and the second LLR with a second detection threshold, the threshold unit being configured to output an UP command if the first LLR is equal to or greater than the first detection threshold, output a DOWN command if the second LLR is equal to or greater than the second detection threshold, and otherwise output a HOLD command.

10. The WTRU of claim 9 wherein the hypothesis test unit performs the hypothesis test based on multiple measurements of the E-RGCH signals.

11. The WTRU of claim 9 wherein the E-RGCH decoder further comprises:

a second hypothesis test unit configured to perform a hypothesis test on E-RGCH signals received from at least one non-serving radio link (RL).

12. The WTRU of claim 9 wherein the E-RGCH decoder further comprises:

a reliability test unit for performing a reliability test on the E-RGCH signals, whereby the hypothesis test is performed only if the reliability test is passed.

13. The WTRU of claim 12 wherein the reliability test is configured to compare a signal-to-noise ratio (SNR) of the E-RGCH to an SNR threshold.

14. The WTRU of claim 9 wherein the serving grant processor comprises:

a first serving grant calculator configured to calculate a first serving grant candidate based on the absolute grant and a relative grant received from a serving radio link set (RLS);

a second serving grant calculator configured to calculate a second serving grant candidate based on a relative grant received from at least one non-serving radio link (RL) and a previous serving grant; and a controller configured to output a new serving grant based on the first serving grant candidate and the second serving grant candidate.

15. An integrated circuit (IC) comprising the E-AGCH decoder, the E-RGCH decoder and the serving grant processor of the WTRU of claim 9.

16. A wireless transmit/receiver unit (WTRU) that supports enhanced uplink (EU) such that an absolute grant is received via an enhanced dedicated channel (E-DCH) absolute grant channel (E-AGCH), and a relative grant is received via an DCH relative grant channel (E-RGCH), the wireless transmit/receive unit generating a serving grant, the WTRU comprising:

an E-AGCH decoder configured to decode E-AGCH signals received via the E-AGCH to detect an absolute grant;

an E-RGCH decoder configured to decode E-RGCH signals received via the E-RGCH to detect at least one relative grant;

a serving grant processor configured to generate a serving grant based on at least one of the absolute grant and the relative grant;

a first hypothesis test unit configured to perform a hypothesis test on E-RGCH signals received from a serving radio link set (RLS);

a second hypothesis test unit configured to perform a hypothesis test on E-RGCH signals received from at least one non-serving radio link (RL);

a log likelihood ratio (LLR) calculation unit for calculating an LLR of a conditional probability that a DOWN command is detected to a conditional probability that a HOLD command is detected based on E-RGCH signals received from the at least one non-serving RL; and a threshold unit for comparing the LLR with a detection threshold, the threshold unit being configured to output a DOWN command if the LLR is equal to or greater than the detection threshold, and otherwise output a HOLD command.

* * * * *